H. RICHARDSON.
AUTOMATIC WEIGHING APPARATUS.
APPLICATION FILED JUNE 7, 1905.
1,160,762.
Patented Nov. 16, 1915.
3 SHEETS—SHEET 2.
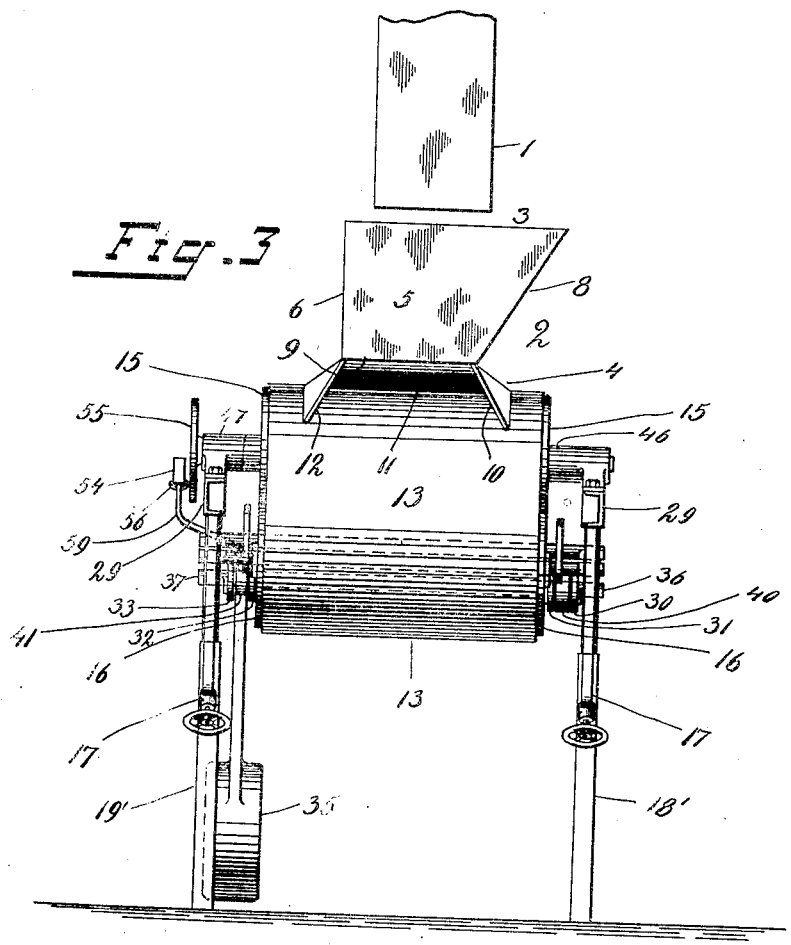
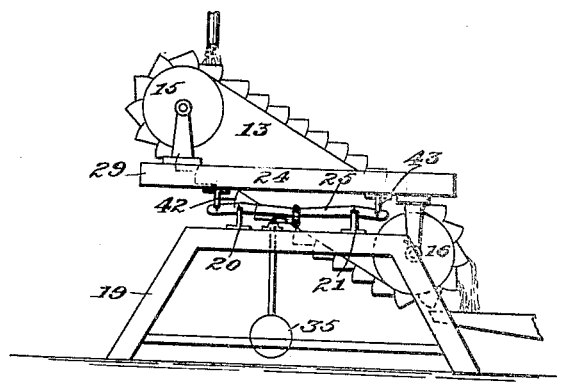

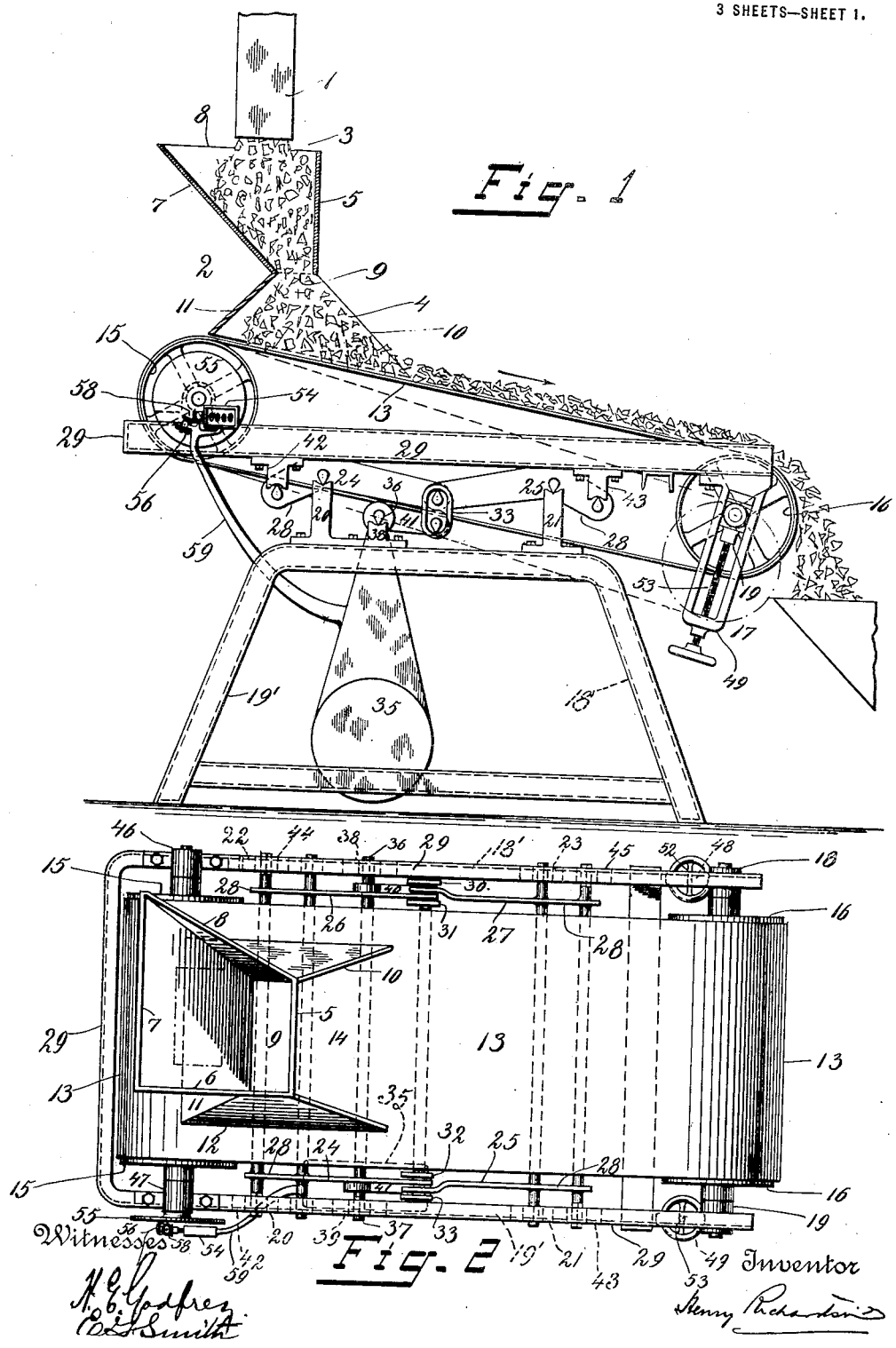

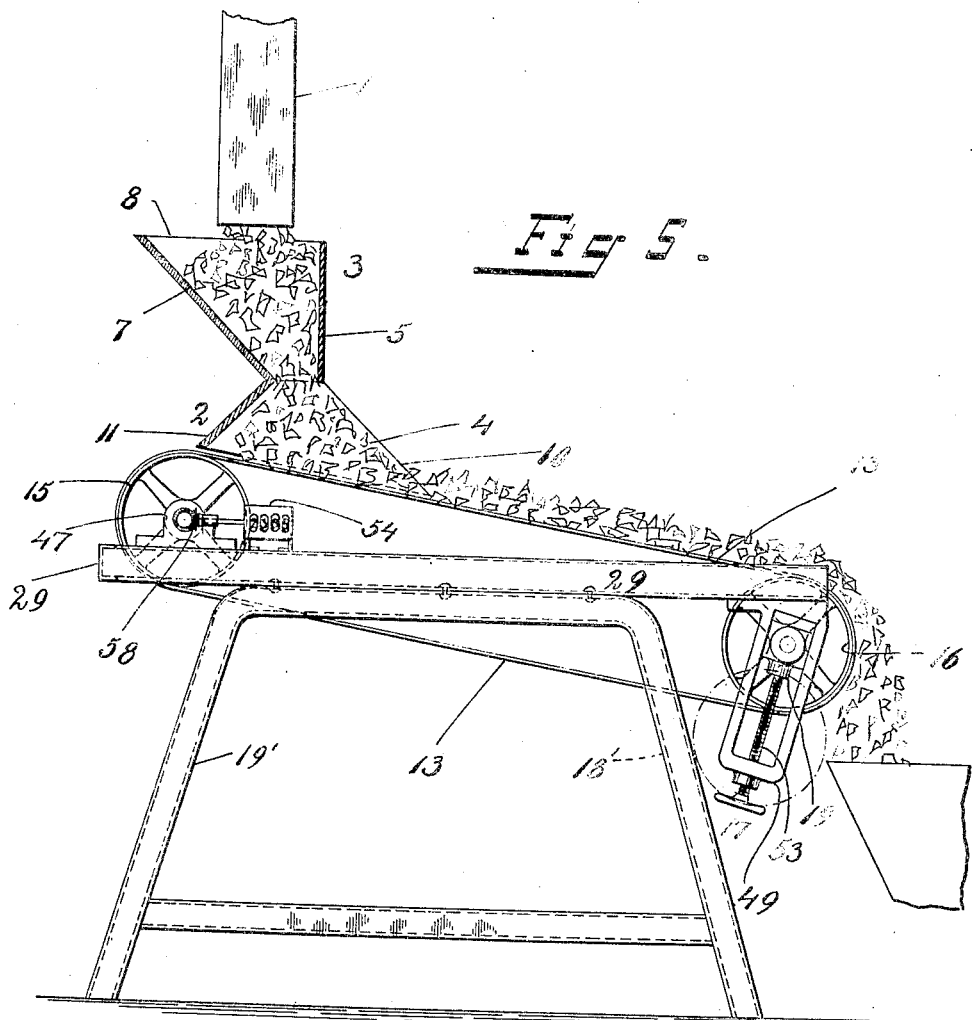

UNITED STATES PATENT OFFICE.

HENRY RICHARDSON, OF PASSAIC, NEW JERSEY.

AUTOMATIC WEIGHING APPARATUS.

1,160,762.

Specification of Letters Patent.

Patented Nov. 16, 1915.

Application filed June 7, 1905. Serial No. 264,053.

*To all whom it may concern:*

Be it known that I, HENRY RICHARDSON, a subject of the King of Great Britain, residing at Passaic, in the county of Passaic and State of New Jersey, have invented certain new and useful Improvements in Automatic Weighing Apparatus, of which the following is a specification, reference being had therein to the accompanying drawing.

My invention relates to an automatic and continuously weighing and registering device, the object being to provide a device which is simple in construction and by which granular, powdered and liquid materials may be automatically and continuously weighed and registered.

In my invention I utilize the force of gravity of a falling body as motive power, actuating an ordinary conveying band, onto and over which the materials are delivered, and by the movement of which band, in its relation to the weighing device and counting mechanism, I am able to secure a numerical registration by which I determine the load passing over said band.

In the drawings accompanying and forming part of this specification, in order to indicate the advantages of my machine, a simple adaptation involving my invention, and in which:

Figure 1 is a side elevation of the entire weighing apparatus. Fig. 2 is a plan view with the feed chute removed. Fig. 3 is an end elevation looking toward the discharge or lower end of the conveyer. Fig. 4 shows a modification of the conveyer as adapted to weigh liquids. Fig. 5 is a further modification showing an apparatus wherein the scale beams are dispensed with, the counter or cyclometer registering the amount of material carried by the conveyer.

Like numerals refer to like parts throughout the several figures.

1 represents the feed chute which delivers the material to be weighed into the hopper 2, consisting of an upper part as 3 and a lower part as 4, said upper part 3 consisting of four walls, two of which, 5 and 6, are vertical, the other two, 7 and 8, being inclined. This formation permits of a more regular feeding of certain materials. The lower portion of the hopper forms the discharge spout, and is inclosed on three sides by the walls 10, 11 and 12, the inclination of these sides being arranged to suit the angle of repose of the material being weighed.

The walls 10, 11, and 12 are shown as stationary, but this is not essential. The bell-shaped opening 14, extends toward the conveyer, 13, and by the omission of one side permits the conveyer 13 to take away the material in the direction indicated by the arrow.

The hopper 2 is mounted in a suitable manner above a drum 15, which latter is mounted on a higher elevation than the second drum, 16, so as to obtain an inclination of the conveyer, 13.

The correct line of the conveyer insures sufficient friction between the conveyer and material to utilize the weight of the latter as motive power in driving the former. This principle is well known, being the principle employed in a tread mill where the weight of a man or animal acting upon a series of steps, or an endless band, furnishes driving power.

The various parts of the mechanism are supported by horses 18′ and 19′, at the top of which are rigidly secured four standards 20, 21, 22 and 23, having recessed tops forming the fulcrums for the scale beams, 24, 25, 26 and 27; the shorter arm 28, of which beams carry the supports of the conveyer-frame, 29, and the longer arms are connected to the pendulum weight 35, by links 33. The supports 42, 43, 44 and 45 take the bearing of the conveyer on the knife edges of the weighing apparatus. The drum 16 is made adjustable by means of a screw 53, and this provides for any required inclination in the conveyer.

In order to register the weight of the material passing over the band, the friction roller 56 coupled to the cyclometer 54 by means of the friction roller 58, is mounted upon the arm 59, which is rigidly attached to the pendulum weight 35, which extends to the drum shafts, to which latter is attached the disk, 55, and upon the face of this the friction roller 56 revolves.

It will thus be seen that the registering of the cyclometer increases as it moves from the center to the periphery of the disk 55, and this movement is in relation to the weight of the material falling on to the top of the conveyer. Thus the varying weight of material fed upon the conveyer 13, produces a corresponding deflection on the pendulum and registers the weight of the material no matter how the supply of the latter from the chute fluctuates.

When the supply to the belt ceases and the conveying belt is empty, the position of the friction roller will be in the center of the disk, at which position it ceases to revolve.

It will be obvious that the construction of a device to accomplish the aforementioned results, has many points of advantage and modifications not specially mentioned above, and details in the construction may be changed without departing from the spirit of my invention, as claimed. I, therefore, wish to avail myself of such modifications and equivalents as fall properly within the spirit of my invention.

In Fig. 4 I have shown a modification of the device wherein the conveyer is provided with external liquid-receiving cups, and in Fig. 5 a conveyer which operates without the use of a scale beam.

Having thus described my invention, what I claim as new therein and desire to secure by Letters Patent is:

1. In an apparatus of the character herein specified, the combination of a conveyer, means for uninterruptedly supplying material to said conveyer, the latter being at an inclination to be driven solely by the gravitation of the material thereon, and a registering apparatus controlled by the weight of the material traveling with the conveyer and having means for operating it at a rate determined also by the rate of movement of the conveyer.

2. In an apparatus of the character herein specified, the combination with a band or conveyer mounted on an incline and adapted to be driven by the gravity of the material being weighed, of a supply hopper mounted above the conveyer, and a registering apparatus having means for actuating it by said conveyer and at a rate determined by the rate of movement of the conveyer and also controlled by the weight of material traveling with the conveyer.

3. In a device of the character herein specified, a receiving hopper provided with a discharge adapted to regulate the flow of material therefrom, the upper portion of the hopper having two vertical walls and two walls placed at an angle, and the lower portion of the hopper being inclosed by three walls placed at an angle and suited to the angle of repose of the material to be weighed, the front of the lower part of the hopper being open forming a discharge, substantially as shown and described.

4. In an apparatus of the character herein specified, the combination of a conveyer arranged at an inclination and operative by the weight of material thereon, weighing mechanism having a drum supported thereby over which the conveyer passes, a friction wheel rotative with said drum, a registering device, and means for operating said registering device, including a friction wheel coöperative with the weighing mechanism and movable radially of the first-mentioned friction wheel.

5. In an apparatus of the character herein specified, the combination of an inclined flexible traveling conveyer adapted to receive and travel with and under the influence of the weight of a stream of material, a drum over which the conveyer passes, a friction wheel rotative with said drum, weighing mechanism yieldingly supporting said drum, a registering device, and means for operating said registering device, including a friction wheel coöperative with said weighing mechanism and movable in contact with the side face of the other wheel.

6. In an apparatus of the character herein specified, the combination of a flexible traveling conveyer adapted to support a moving stream of material, means for uninterruptedly supplying material to said conveyer to impart a traveling movement thereto, and a registering device coöperative with the conveyer and operable at a rate determined by the weight of the material and said traveling movement of the conveyer.

7. In an apparatus of the character herein specified, the combination of a conveyer arranged at an inclination and adapted for traveling movement, means for uninterruptedly supplying material to the upper end thereof to operate the same, and a registering device coöperative with the conveyer and operable by the weight of said material to register said traveling movement.

8. In an apparatus of the class specified, the combination of a flexible conveyer, means for supplying material to the conveyer, weighing mechanism having a rotatable drum supported thereby and over which said conveyer passes, and embodying a counterweight displaceable by depression of said drum, a registering device, means for operating the registering device continuously by said drum at a rate determined by the speed of movement of the conveyer, and means operative by the counterweight of the weighing mechanism for controlling the speed of movement of the registering device according to the weight imposed by the conveyer on the weighing mechanism.

9. In an apparatus of the character described, the combination of a yieldably supported conveyer, means for supplying material thereto to operate the conveyer, and registering means operable by the material thereon and also having means for operating it from said conveyer at a rate determined by the speed of movement of said conveyer.

10. In an apparatus of the class described, the combination of an elongated inclined conveyer, means for supplying material thereto to operate the conveyer automatically, the conveyer being movable with the material thereon, and a registering device operable by the material moving with the conveyer and also having means for operating it at a rate determined by the rate of movement of the conveyer.

11. In an apparatus of the class described, the combination of an elongated flexible conveyer, weighing mechanism for yieldingly supporting it, means for supplying material to travel with the conveyer and to operate it, and a registering device for the weighing mechanism operated by the material on the conveyer and also having means for operating it at a rate determined by the speed of movement of the conveyer.

12. In an apparatus of the class described, the combination of an elongated conveyer, means for adjusting the inclination thereof to accommodate materials of different kinds, means for supplying material to travel with the conveyer to actuate it, and a register having means connecting it to the conveyer whereby it is driven by the conveyer, the register being also operated by the material on the conveyer.

In testimony whereof I hereto affix my signature in presence of two witnesses.

HENRY RICHARDSON.

Witnesses:
   LEON LASKI,
   H. E. GODFREY.